United States Patent
Oftedahl

(10) Patent No.: US 11,987,330 B2
(45) Date of Patent: May 21, 2024

(54) MONITORING MODULE

(71) Applicant: Jotun A/S, Sandefjord (NO)

(72) Inventor: Geir Axel Oftedahl, Sandefjord (NO)

(73) Assignee: Jotun A/S, Sandefjord (NO)

( * ) Notice: Subject to any disclaimer, the term of this patent is extended or adjusted under 35 U.S.C. 154(b) by 414 days.

(21) Appl. No.: 17/601,769

(22) PCT Filed: Mar. 24, 2020

(86) PCT No.: PCT/EP2020/058231
§ 371 (c)(1),
(2) Date: Oct. 6, 2021

(87) PCT Pub. No.: WO2020/207791
PCT Pub. Date: Oct. 15, 2020

(65) Prior Publication Data
US 2022/0194532 A1    Jun. 23, 2022

(30) Foreign Application Priority Data
Apr. 10, 2019  (GB) ..................................... 1905102

(51) Int. Cl.
*B63B 59/10*       (2006.01)
*G05D 1/00*        (2006.01)

(52) U.S. Cl.
CPC ........... *B63B 59/10* (2013.01); *G05D 1/0038* (2013.01); *G05D 1/0055* (2013.01); *G05D 1/0278* (2013.01)

(58) Field of Classification Search
CPC .... B63B 59/10; G05D 1/0038; G05D 1/0055; G05D 1/0278; G05D 1/0282; B25J 9/1664; B25J 11/0085; B25J 19/0075
(Continued)

(56) References Cited

U.S. PATENT DOCUMENTS

| 8,506,719 | B2 | 8/2013 | Holappa et al. |
| 9,038,557 | B2 * | 5/2015 | Smith .................... B63B 17/00 901/1 |

(Continued)

FOREIGN PATENT DOCUMENTS

| EP | 2762401 A | 8/2014 |
| GB | 2471204 | 12/2010 |

(Continued)

OTHER PUBLICATIONS

PCT International Search Report & Written Opinion for corresponding PCT Application No. PCT/EP2020/058231, dated Jul. 6, 2020, 13 pages.

(Continued)

*Primary Examiner* — Anthony D Wiest
(74) *Attorney, Agent, or Firm* — Dority & Manning, PA

(57) ABSTRACT

A method of controlling a robot configured to clean a hull of a vessel whilst travelling over said hull, the method comprising: receiving at least one signal indicative of a speed of the vessel; during cleaning being performed by the robot, detecting that cleaning being performed by the robot is to be paused based on (i) determining, from said at least one signal, that the speed of the vessel exceeds a predetermined speed threshold, or (ii) predicting, using said at least one signal, that the speed of the vessel will exceed the predetermined speed threshold within a predetermined time period; in response to said detecting that cleaning being performed by the robot is to be paused, outputting a pause cleaning signal indicating that said cleaning is to be paused; whilst said cleaning is paused, detecting that cleaning performed by the robot is to be restarted based on the determining that the speed of the vessel has dropped below the predetermined threshold, and in response, outputting a (Continued)

restart cleaning signal indicating that cleaning by the robot is to be restarted.

20 Claims, 6 Drawing Sheets

(58) Field of Classification Search
USPC .......................................................... 114/222
See application file for complete search history.

(56) References Cited

U.S. PATENT DOCUMENTS

| | | |
|---|---|---|
| 2010/0126403 A1* | 5/2010 | Rooney, III ......... G05D 1/0227 901/1 |
| 2011/0282536 A1 | 11/2011 | Rooney |
| 2012/0109376 A1 | 5/2012 | Lee et al. |
| 2014/0076223 A1 | 3/2014 | Smith |

FOREIGN PATENT DOCUMENTS

| | | |
|---|---|---|
| JP | 2012509225 A | 4/2012 |
| JP | 2013067358 A | 4/2013 |
| JP | 2014125201 A | 7/2014 |
| JP | 2017526573 A | 9/2017 |
| WO | WO2010059195 A1 | 5/2010 |
| WO | WO 2014/043395 | 3/2014 |
| WO | WO 2014/043411 | 3/2014 |
| WO | WO2016001227 A1 | 1/2016 |
| WO | WO 2018/130905 | 7/2018 |

OTHER PUBLICATIONS

GB Office Action for corresponding Application No. GB1905102.8, dated Oct. 4, 2019, 3 pages.
English translation of the Japanese Office Action for corresponding Application No. 2021-559830, dated Nov. 7, 2023, 4 pages.
Chinese Office Action (w/ Machine translation) for corresponding Application No. 202080027725.3, issued Feb. 29, 2024, 28 pages.

* cited by examiner

MONITORING MODULE

CROSS-REFERENCE TO RELATED APPLICATIONS

This application is a U.S. national phase entry of International Application number PCT/EP2020/058231 filed on Mar. 24, 2020, which, in turn, is based upon and claims the benefit of priority from prior United Kingdom Application number 1905102.8 filed on Apr. 10, 2019, the entire contents of both of which are incorporated herein by reference.

TECHNICAL FIELD

The present disclosure relates to a monitoring module. In particular, the present disclosure relates to a monitoring module for controlling a robot that is configured to clean a hull of a vessel whilst travelling over the hull.

BACKGROUND

All surfaces submerged in seawater will experience fouling of organisms such as bacteria, diatoms, algae, mussels, tube worms and barnacles. Marine fouling is the undesirable accumulation of microorganisms, algae and animals on structures submerged in seawater. The fouling organisms can be divided into microfoulers (bacterial and diatomic biofilms) and macrofoulers (e.g. macroalgae, barnacles, mussels, tubeworms, bryozoans) which live together forming a fouling community. In a simplistic overview of the fouling process, the first step is the development of a conditioning film where organic molecules adhere to the surface. This happens instantaneously when a surface is submerged in seawater. The primary colonizers, the bacteria and diatoms, will settle within a day. The secondary colonizers, spores of macroalgae and protozoa, will settle within a week. Finally, the tertiary colonizers, the larvae of macrofoulers, will settle within 2-3 weeks.

The prevention of marine fouling is a known problem. Fouling of the hull of a vessel will lead to increased drag resistance and increased fuel consumption or reduced speed. Increased fuel consumption will lead to increased $CO_2$, $NO_x$ and sulphur emissions. Heavy fouling can also lead to reduced manoeuvrability of the vessel. Many commercial vessels (e.g. container ships, bulk carriers, tankers, passenger ships) are trading worldwide. If the hull of a vessel is fouled the organisms will be transported from its original ecosystem to a different ecosystem. This is problematic as new species can be introduced in sensitive ecosystems and eliminate indigenous species.

Traditionally, antifouling coatings have been used to prevent the settlement and growth of marine organisms. The most efficient antifouling coatings contain biocides that will leak out from the coating film and thereby reduce the amount of fouling.

Robots, sometimes phrased as "crawlers" or ROVs (remotely operated vehicles), have also previously been used for cleaning of surfaces submerged in water e.g. for use on ship's hulls. Background art can be found in WO2014043411, U.S. Pat. No. 8,506,719, and WO2014043395.

SUMMARY

The inventors have identified that the application of antifouling coatings to a vessel has limitations. In particular, commercial vessels often operate in different waters, in different trade, with different activity, including idle periods. The risk of fouling is higher when objects are stationary or at low speed as the organisms have longer time to settle on the surface. Typical service intervals for commercial vessels are from 24 to 90 months. When the vessel is going into dry-dock for service and repair, the antifouling coating is usually specified according to the planned trade for the next period. However, the trade of a vessel can change during the service interval. It is therefore difficult to design and specify an antifouling coating that will be optimal for all possible situations. The use of biocides is highly regulated. In certain harbors where the water circulation is low there are also restrictions on the use of biocide containing antifouling coatings as the biocide concentration accumulates.

The inventors have also identified that whilst robots have previously been used for cleaning of surfaces submerged in water, the cleaning process has been either manually initiated, determined according to a predefined frequency or triggered by fouling of the vessel (for example increased chlorophyll level measured by the robot). These are inefficient, complex and error prone methods which will lead to a higher risk of fouling of the surface. It is also difficult to achieve an optimal cleaning method with a predetermined cleaning frequency as the trade of the vessel can change and the cleaning process will no longer be optimal for the vessels trade and experienced fouling risk.

The inventors have identified that if a robot capable of effectively cleaning the surface of a vessel is used, an antifouling coating with lower amount of biocides or even biocide free coatings could be used.

Due to the fact that the robot performs cleaning of the hull of the vessel only when conditions are conducive for cleaning, embodiments of the present disclosure advantageously enable the use of the robot without using any wire or other tethering between the robot and the docking station (or other part of the vessel), which may otherwise be needed to prevent the robot from becoming detached from the vessel and lost.

In embodiments of the present disclosure, to reduce the amount of fouling on the hull of a vessel, continuous cleaning is performed by a robot whilst travelling over the vessel.

According to one aspect of the present disclosure there is provided a method of controlling a robot configured to clean a hull of a vessel whilst travelling over said hull, the method comprising: receiving at least one signal indicative of a speed of the vessel; during cleaning being performed by the robot, detecting that cleaning being performed by the robot is to be paused based on (i) determining, from said at least one signal, that the speed of the vessel exceeds a predetermined speed threshold, or (ii) predicting, using said at least one signal, that the speed of the vessel will exceed the predetermined speed threshold within a predetermined time period; in response to said detecting that cleaning being performed by the robot is to be paused, outputting a pause cleaning signal indicating that said cleaning is to be paused; whilst said cleaning is paused, detecting that cleaning performed by the robot is to be restarted based on the determining that the speed of the vessel has dropped below the predetermined threshold, and in response, outputting a restart cleaning signal indicating that cleaning by the robot is to be restarted.

There is a high risk that the robot will be damaged or lost during high speed. The fouling risk is also low at high speed as most of the marine organisms cannot settle at surfaces at high speed. Thus in embodiments of the present disclosure the continuous cleaning is paused if vessel reaches a certain speed or it is predicted that the vessel will imminently reach this speed.

The at least one signal may comprise a sensor signal received from at least one sensor, the sensor signal comprising sensor data output by the at least one sensor.

The at least one sensor may comprise one or more sensors on the robot.

The at least one sensor may comprise one or more sensor on the vessel.

The at least one sensor may comprise an anchor sensor and the sensor data indicates that an anchor of the vessel is in a raised or lowered state.

The at least one sensor may comprise one or more of: a speed sensor and the sensor data comprises speed data indicating the speed of the vessel; a vibration sensor and the sensor data comprises vibration data indicating the speed of the vessel.

The at least one signal may comprise a signal received from a remote computing device external to said robot.

The signal received from the remote computing device may comprise one or more of: speed data indicating the speed of the vessel; and an indication that an anchor of the vessel is in a raised or lowered state.

The at least one signal may be indicative of a Speed Over the Ground of the vessel. In these embodiments, the predetermined speed threshold has a value of between 0.1-40 knots.

The at least one signal may be indicative of a Speed Through Water of the vessel. In these embodiments, the predetermined speed threshold has a value between 0.1-40 knots.

The method may further comprise: during cleaning being performed by the robot, detecting that cleaning being performed by the robot is to be paused based on (i) determining that the robot is at risk of damage, and in response, outputting the pause cleaning signal indicating that said cleaning is to be paused; whilst said cleaning is paused, detecting that the object is no longer at risk of damage, and in response, outputting the restart cleaning signal indicating that cleaning by the robot is to be restarted.

The determining that the robot is at risk of damage may comprise: receiving a camera signal from a camera, the camera signal comprising image data; and detecting an object in a path of the robot based on analysing the image data. In these embodiments, the camera may be on the robot or on the vessel.

The determining that the robot is at risk of damage may comprise receiving a signal indicative that the robot is at risk of damage.

The signal indicative that the robot is at risk of damage may comprise wind or wave information.

The signal indicative that the robot is at risk of damage may be received from a sensor on the robot, a sensor on the vessel or from a remote computing device external to said robot.

The method may further comprise: calculating a fouling risk value based on receiving a signal indicative of a risk of fouling on the hull of the vessel, and comparing the fouling risk value with a fouling risk threshold; during cleaning being performed by the robot, detecting that cleaning being performed by the robot is to be paused based on determining that the fouling risk value is less than the fouling risk threshold, and in response, outputting the pause cleaning signal indicating that said cleaning is to be paused; whilst said cleaning is paused, detecting that cleaning performed by the robot is to be restarted based on determining that the fouling risk value has increased above the predetermined threshold, and in response, outputting the restart cleaning signal indicating that cleaning by the robot is to be restarted.

The signal indicative of fouling on the hull of the vessel may comprise information on one or more of: (i) an amount of chlorophyll in an aquatic environment of the vessel; (ii) a pH level of the aquatic environment; (iii) a nutrient level in the aquatic environment; (iv) a light intensity in the aquatic environment sensed; (v) a saline level of the aquatic environment; (vi) a temperature of the aquatic environment; (vii) an amount of carbon dioxide in the aquatic environment; (viii) a geographical location of the vessel; (ix) an amount of gaseous oxygen dissolved in water in the aquatic environment of the vessel; and (x) a depth of the aquatic environment.

Whilst said cleaning is paused, the robot may be configured to be stationary.

Upon detecting that cleaning being performed by the robot is to be paused, the robot may be configured to move to a docking station on the vessel.

The method may be performed by a monitoring module on said robot, and wherein upon detecting that cleaning being performed by the robot is to be paused, the method may comprise outputting the pause cleaning signal to a cleaning module on the robot to pause said cleaning; and upon detecting that cleaning performed by the robot is to be restarted, the method may comprise outputting the restart cleaning signal to the cleaning module on the robot to restart said cleaning.

The method may be performed by a monitoring module on said robot, and wherein upon detecting that cleaning being performed by the robot is to be paused, the method may comprise outputting the pause cleaning signal to a remote computing device external to said robot for validation by a user; and upon detecting that cleaning performed by the robot is to be restarted, the method may comprise outputting the restart cleaning signal to the remote computing device external to said robot for validation by the user.

The method may be performed by a monitoring module on a remote computing device external to said robot.

Upon detecting that cleaning being performed by the robot is to be paused, the method may comprise automatically transmitting the pause cleaning signal to a cleaning module on the robot to pause said cleaning; and upon detecting that cleaning performed by the robot is to be restarted, the method may comprise automatically transmitting the restart cleaning signal to the cleaning module on the robot to restart said cleaning.

Upon detecting that cleaning being performed by the robot is to be paused, the method may comprise outputting the pause cleaning signal to a user for validation before transmitting the pause cleaning signal to a cleaning module on the robot to pause said cleaning; and upon detecting that cleaning performed by the robot is to be restarted, the method may comprise outputting the restart cleaning signal to a user for validation before transmitting the restart cleaning signal to the cleaning module on the robot to restart said cleaning.

According to another aspect of the present disclosure there is provided a computer-readable storage medium comprising instructions which, when executed by a processor of a device cause the device to perform the method steps described herein.

The device may correspond to the robot referred to herein or a computing device external to the robot (e.g. a computing device on a vessel or on shore in communication with the robot).

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a robot configured to clean a hull of a vessel whilst travelling over said hull, the robot comprising a processor configured to: receive at least one signal indicative of a speed of the vessel; during cleaning being performed by the robot, detect that cleaning being performed by the robot is to be paused based on (i) determining, from said at least one signal, that the speed of the vessel exceeds a predetermined speed threshold, or (ii) predicting, using said at least one signal, that the speed of the vessel will exceed the predetermined speed threshold within a predetermined time period; in response to said detection that cleaning being performed by the robot is to be paused, output a pause cleaning signal indicating that said cleaning is to be paused; whilst said cleaning is paused, detect that cleaning performed by the robot is to be restarted based on the determining that the speed of the vessel has dropped below the predetermined threshold, and in response, output a restart cleaning signal indicating that cleaning by the robot is to be restarted.

The processor may be configured to output the pause cleaning signal to a cleaning module on the robot to pause said cleaning; and output the restart cleaning signal to the cleaning module on the robot to restart said cleaning.

The processor may be configured to output the pause cleaning signal to a remote computing device external to said robot for validation by a user; and output the restart cleaning signal to the remote computing device external to said robot for validation by the user.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
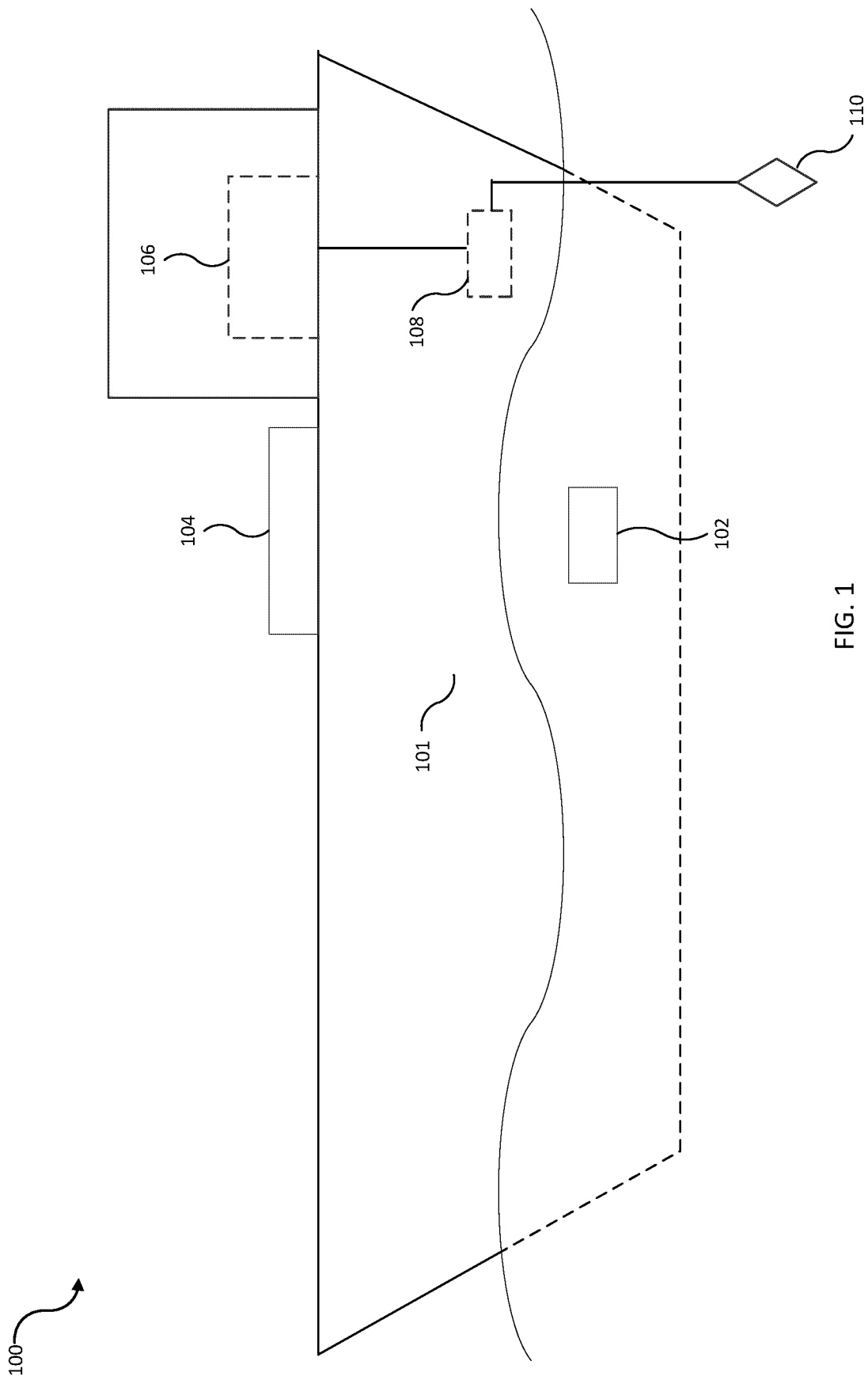
FIG. 1 illustrates a vessel and a robot.

FIG. 1 illustrates an aquatic vessel 100 for example a container ship, bulk carrier, tanker, or passenger ship. The aquatic vessel comprises a hull 101.

Before operation, a robot 102 will be stationary at a robot station 104 (a docking station) which may be used to charge the robot 102. The robot station 104 will be positioned on the vessel above the sea level. In some embodiments of the present disclosure, the robot station 104 allows for parking of the robot 102 when cleaning operations performed by the robot are paused. During cleaning of the surface of the hull 101, the robot 102 may traverse any surface of the hull 101 where marine fouling may form (e.g. a flat bottom or side bottom of the hull).

As shown in FIG. 1 a computing device 106 may be provided in a deckhouse of the vessel for communication with the robot 102. Furthermore an anchor sensor 108 coupled to the anchor 110 of the vessel may be provided, the anchor sensor 108 being in communication with the computing device 106.

In embodiments of the present disclosure, a monitoring module is configured to control the cleaning of the hull 101 of the vessel 100 whilst the robot 102 travels over the hull 101. In contrast to known techniques, in embodiments described herein the default state of the robot 102 is to continuously clean the hull 101 and the cleaning operation is only paused when the robot 102 needs to recharge its power source (e.g. by returning to the robot station 104) or when it is unsafe for the robot to perform its cleaning e.g. when the vessel 100 is travelling at high speed. When the vessel 100 is travelling at high speed there is a high risk that the robot will be damaged or lost during high speed. The fouling risk is also low at high speed as most of the marine organisms cannot settle at surfaces at high speed.

Reference to "cleaning" is used herein to refer to the removal of fouling organisms from the surface of the hull 101, such cleaning is sometimes referred to as "grooming" or "proactive cleaning". By performing the continual cleaning of the surface of the hull 101, the robot 102 typically performs removal of the initial conditioning film, where organic molecules have adhered to the surface of the hull 101, and/or primary colonizers and before secondary colonizers have had a chance to settle. However, it will be appreciated that the cleaning performed by the robot 102 may also involve removal of secondary colonizers and any subsequent colonizers.

The duration of a continuous cleaning operation performed by the robot 102 that is described herein may vary. A continuous cleaning operation may be continual in that the cleaning is only paused when the robot returns to the docking station 104 to be recharged. Alternatively the continuous cleaning operation may have a set duration after which the robot returns to the docking station 104 before commencing a new continuous cleaning operation. If for example the vessel is idle for 1 week and the robot has spent half a day cleaning the hull it might not be necessary for the robot to continue to clean the hull for the rest of the day. The continuous cleaning operation can thus end and the robot can then start a new continuous cleaning operation again the next day (e.g. to reduce the wear of the robot).

Whilst FIG. 1 illustrates a single robot 102 on the vessel for simplicity, it will be appreciated that there may be multiple robots on the vessel. Similarly, whilst a single robot station 104 is shown in FIG. 1, it will be appreciated that there may be multiple robot stations on the vessel.

Figure 2:
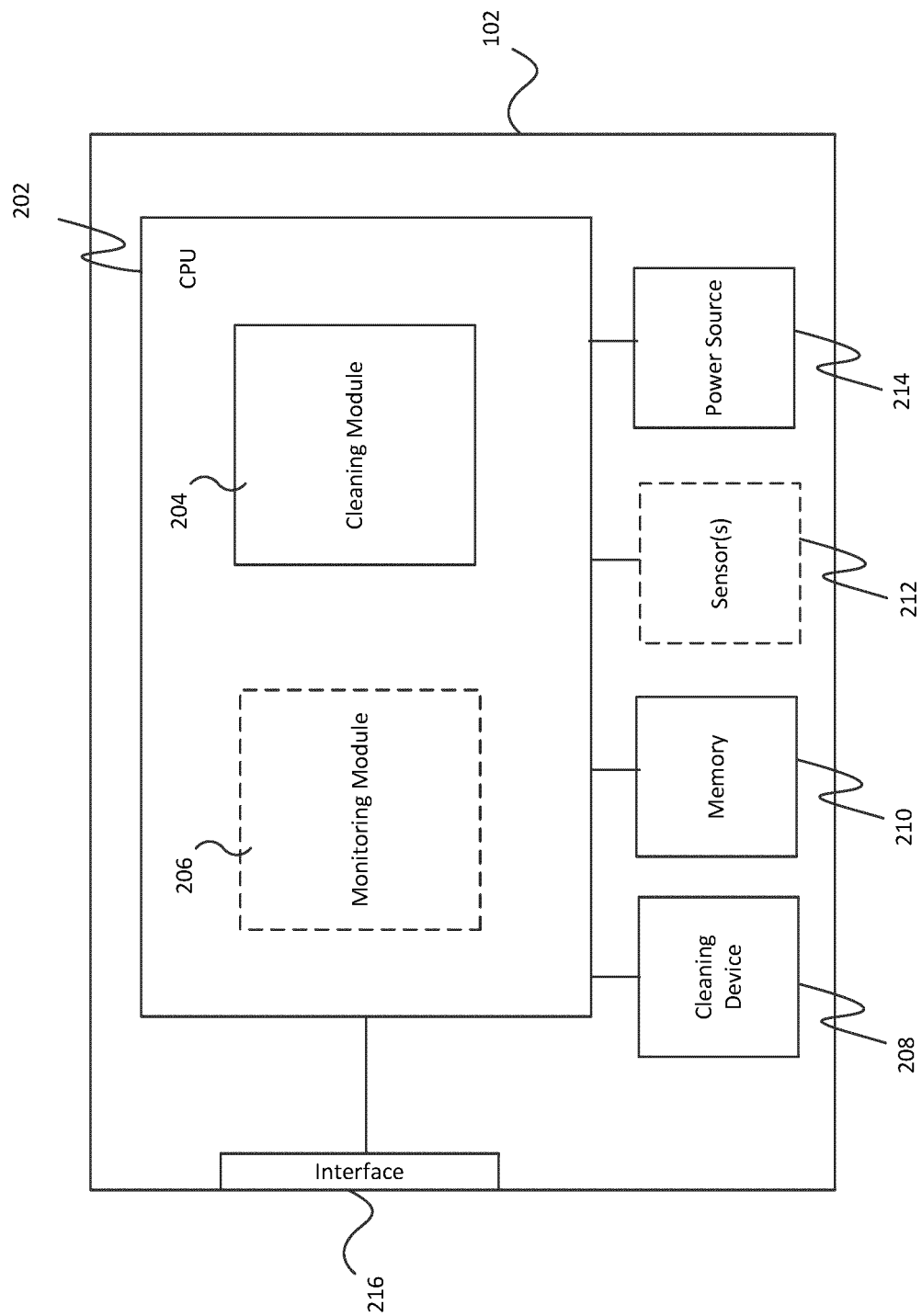
FIG. 2 is a schematic block diagram of the robot.

FIG. 2 is a schematic block diagram of the robot 102. As shown in FIG. 2, the robot 102 comprises a central processing unit ("CPU") 202. The CPU 202 comprises a cleaning module 204 which is configured to control a cleaning device 208 (which may take the form of a rotary cylindrical brush) which is coupled to the CPU 202 and performs the removal of fouling organisms from the surface of the hull 101. The cleaning module 204 is configured to pause the cleaning being performed by the cleaning device 208 in response to receiving a pause cleaning signal. The cleaning module 204 is configured to restart the cleaning device 208 to perform cleaning in response to receiving a restart cleaning signal.

The CPU 202 may also comprise a monitoring module 206. It will be apparent from the below that whilst the robot 102 may comprise the monitoring module 206, in alternative embodiments (described in more detail below with reference to FIG. 3c) the monitoring module may be a component of the computing device 106.

The CPU 202 is coupled to a power source 214 (e.g. one or more battery). The power source 214 may be rechargeable e.g. using the robot station 104. The robot 102 also comprises a memory 210 for storing data as is known in the art.

As shown in FIG. 2, the robot 102 may comprise one or more sensor 212 that are configured to output a sensor signal to the monitoring module 206. Each of the sensors described herein may be a physical sensor (i.e. a physical measurement instrument) or a virtual sensor (i.e. software that combines sensed data from multiple physical sensors to compute a measurement).

The sensor(s) 212 may comprise one or more sensor configured to output a sensor signal indicative of a speed of the vessel 100. The sensor(s) configured to output a sensor signal indicative of a speed of the vessel 100 may comprise a speed sensor (e.g. a speed log) configured to output speed data indicating the speed of the vessel 100. The speed sensor may be configured to perform 'Speed Over the Ground' or 'Speed Through Water' measurements. The speed sensor configured to perform a 'Speed Over the Ground' measurement may use GPS information that can be extracted from the navigation system of the vessel, or other GPS sensors on board (e.g. a GPS sensor in the docking station 104). The speed sensor configured to perform a 'Speed Through Water' may use one or more onboard sensors (typically Doppler-based or electromagnetic). It is also possible to use the robot 102 as a virtual sensor for 'Speed Through Water' measurements.

Alternatively or additionally the sensor(s) configured to output a sensor signal indicative of a speed of the vessel 100 may comprise a vibration sensor configured to output vibration data indicative of the speed of the vessel 100. For example the engine of the vessel will generate varying degrees of vibration over the hull 101 based on an operating state of an engine of the vessel (e.g. whether the vessel is stationary with the engine off, stationary with the engine on and the vessel imminently about to begin a journey, travelling at low speed, travelling at high speed etc.).

Whilst the sensor(s) that are configured to output a sensor signal indicative of a speed of the vessel 100 have been described as being located on the robot 102, these sensors may be located on the vessel 100.

A further example of a sensor configured to output a sensor signal indicative of a speed of the vessel 100 which is located on the vessel is the anchor sensor 108. The anchor sensor 108 is configured to output a sensor signal indicative of the anchor 110 of the vessel being in a raised (from which it can be inferred that the vessel is moving or is about to move) or lowered state (from which it can be inferred that the vessel is stationary or is about to stop).

The sensor(s) that are located on the vessel 100 which output a sensor signal indicative of a speed of the vessel 100 may output the sensor signal directly to the monitoring module 206 on the robot 102 via interface 216. Alternatively, the sensor(s) that are located on the vessel 100 may output the sensor signal to the computing device 106 which relays the sensor signal to the robot 102 via interface 216.

The sensor(s) 212 may comprise one or more sensor configured to output a sensor signal indicative that the robot 102 is at risk of damage. The sensor(s) configured to output a sensor signal indicative that the robot 102 is at risk of damage may comprise a camera configured to output a camera signal comprising image data. The camera may output the camera signal directly to the monitoring module 206 which is configured to detect an object in a path of the robot, and thus determine that the robot 102 is at risk of damage, based on analysing the image data. Alternatively, the camera may output the camera signal to the computing device 106 and a user operating the computing device 106 may confirm that the robot 102 is at risk of damage (e.g. by viewing the image data captured by the camera) and transmit a signal indicative that the robot 102 is at risk of damage to the monitoring module 206.

Under water a camera might be difficult to use due to poor visibility. Thus the sensor(s) configured to output a sensor signal indicative that the robot 102 is at risk of damage may additionally or alternatively comprise a sensor that emits light (e.g. a Lidar sensor) or sound (e.g. an acoustic) and measures the reflected pulses to detect that an object is in a path of the robot.

Alternatively or additionally the sensor(s) configured to output a sensor signal indicative that the robot 102 is at risk of damage may comprise a wave sensor configured to sense the degree of waves in the aquatic environment of the vessel 100 and output wave information.

Whilst the wave sensor may be located on the robot 102, alternatively it may be located on the vessel 100. Furthermore the monitoring module 206 may receive wave information from a computing device external to the robot 102 (e.g. computer device 106 on the vessel, a computer device on shore e.g. at a meteorological station, or a computing device in the waters e.g. from a computing device on a weather buoy or on a semi-submersible platform.

The sensor(s) 212 may comprise one or more sensor configured to output a sensor signal indicative of a risk of fouling on the hull of the vessel.

The sensor(s) configured to output a sensor signal indicative of a risk of fouling on the hull of the vessel may comprise one or more of: (i) a chlorophyll sensor configured to sense an amount of chlorophyll in an aquatic environment of the vessel; (ii) a pH sensor configured to sense a pH level of the aquatic environment of the vessel; (iii) a nutrients sensor configured to sense a nutrient level in the aquatic environment of the vessel; (iv) a light intensity sensor configured to sense a light intensity in the aquatic environment of the vessel; (v) a salinity sensor (e.g. a conductivity sensor) configured to sense a saline level of the aquatic environment sensed of the vessel; (vi) a temperature sensor configured to sense a temperature of the aquatic environment of the vessel; (vii) a carbon dioxide sensor configured to sense an amount of carbon dioxide in the aquatic environment of the vessel; (viii) a location sensor (e.g. a GPS sensor) configured to sense a geographical location of the vessel; (ix) a dissolved oxygen sensor configured to sense an amount of gaseous oxygen dissolved in the water in the aquatic environment of the vessel; and (x) a depth sensor (e.g. a pressure sensor) configured to sense a depth of the aquatic environment of the vessel. Such sensors are known to persons skilled in the art and are therefore not described in further detail herein.

Whilst the sensor(s) that are configured to output a sensor signal indicative of a risk of fouling on the hull of the vessel have been described as being located on the robot 102, these sensors may be located on the vessel 100.

Furthermore, a signal indicative of a risk of fouling on the hull of the vessel may be received at the monitoring module 206 directly from a satellite (for example in embodiments whereby a computing device 106 on the vessel comprises the monitoring module 206) or received from the computing device 106 on the vessel (e.g. based on the computing device 106 receiving tdata from a satellite and/or from sensors located on the vessel 100, and supplying the signal indicative of a risk of fouling to the monitoring module 206 on the robot 102).

Figure 3A:
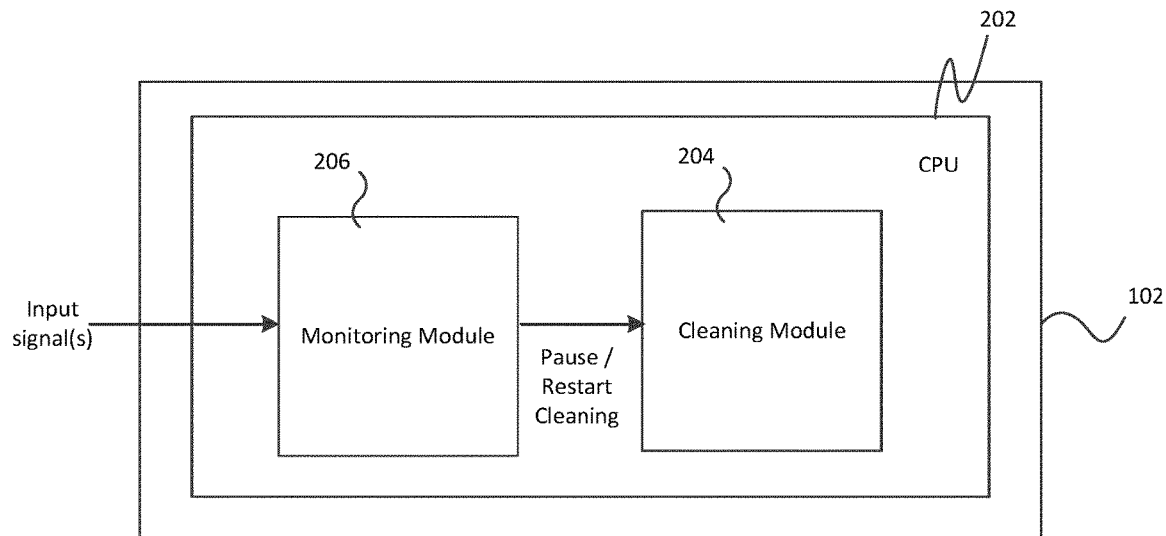
FIG. 3a illustrates a monitoring module and a cleaning module in accordance with one embodiment of the present disclosure.

In some embodiments an interface 216 is provided to enable the robot 102 to receive and transmit data. The interface 216 may comprise a wired and/or a wireless interface. FIG. 3a illustrates a monitoring module 206 and a cleaning module 204 in accordance with one embodiment of the present disclosure in which both the monitoring module 206 and the cleaning module 204 are located on the robot 102.

In the embodiment of FIG. 3a the monitoring module 206 is configured to communicate with the cleaning module 204.

In this embodiment, the monitoring module 206 is configured to receive input signals and based on these input signals the monitoring module 206 is configured to detect that cleaning being performed by the robot is to be paused and output a pause cleaning signal to the cleaning module 204 on the robot 102, and is further configured to detect that cleaning performed by the robot is to be restarted based on these input signals and output a restart cleaning signal to the cleaning module 204 on the robot 102.

In the embodiment of FIG. 3a the input signals comprise at least one signal indicative of a speed of the vessel, this may be received from one or more of: a sensor on the robot, a sensor on the vessel, or a remote computing device.

Figure 3B:
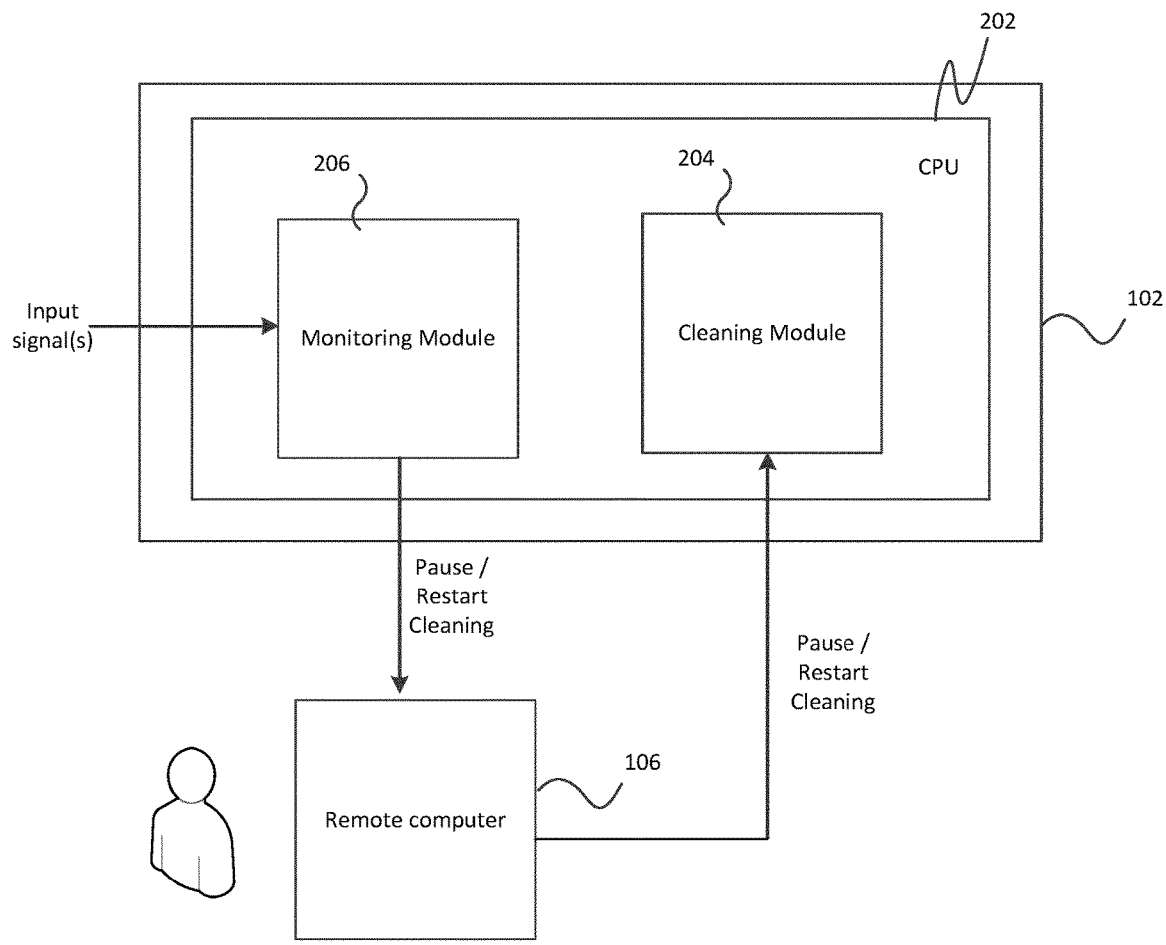
FIG. 3b illustrates the monitoring module and the cleaning module in accordance with another embodiment of the present disclosure.

FIG. 3b illustrates a monitoring module 206 and a cleaning module 204 in accordance with another embodiment of the present disclosure in which both the monitoring module 206 and the cleaning module 204 are located on the robot 102. However, in this embodiment, the monitoring module 206 is configured to communicate with the computing device 106 rather than the cleaning module 204 to provide for "man in the middle" functionality.

In this embodiment, the monitoring module 206 is configured to receive input signals and based on these input signals the monitoring module 206 is configured to detect that cleaning being performed by the robot is to be paused and output a pause cleaning signal to the remote computing device 106 for validation by a user of the remote computing device 106 (e.g. via a display on the remote computing device 106). If the user of the remote computing device 106 confirms that the cleaning being performed by the robot is to be paused (using an input device of the remote computing device 106), the user makes an appropriate input into the remote computing device 106 causing a pause cleaning signal to be output from the remote computing device 106 to the cleaning module 204 on the robot 102.

The monitoring module 206 is further configured to detect that cleaning performed by the robot is to be restarted based on these input signals and output a restart cleaning signal to the remote computing device 106 for validation by the user of the remote computing device 106. If the user of the remote computing device 106 confirms that the cleaning being performed by the robot is to be restarted, the user makes an appropriate input into the remote computing device 106 causing a restart cleaning signal to be output from the remote computing device 106 to the cleaning module 204 on the robot 102.

In the embodiment of FIG. 3b the input signals comprise at least one signal indicative of a speed of the vessel, this may be received from one or more of: a sensor on the robot, a sensor on the vessel or a remote computing device.

Figure 3C:
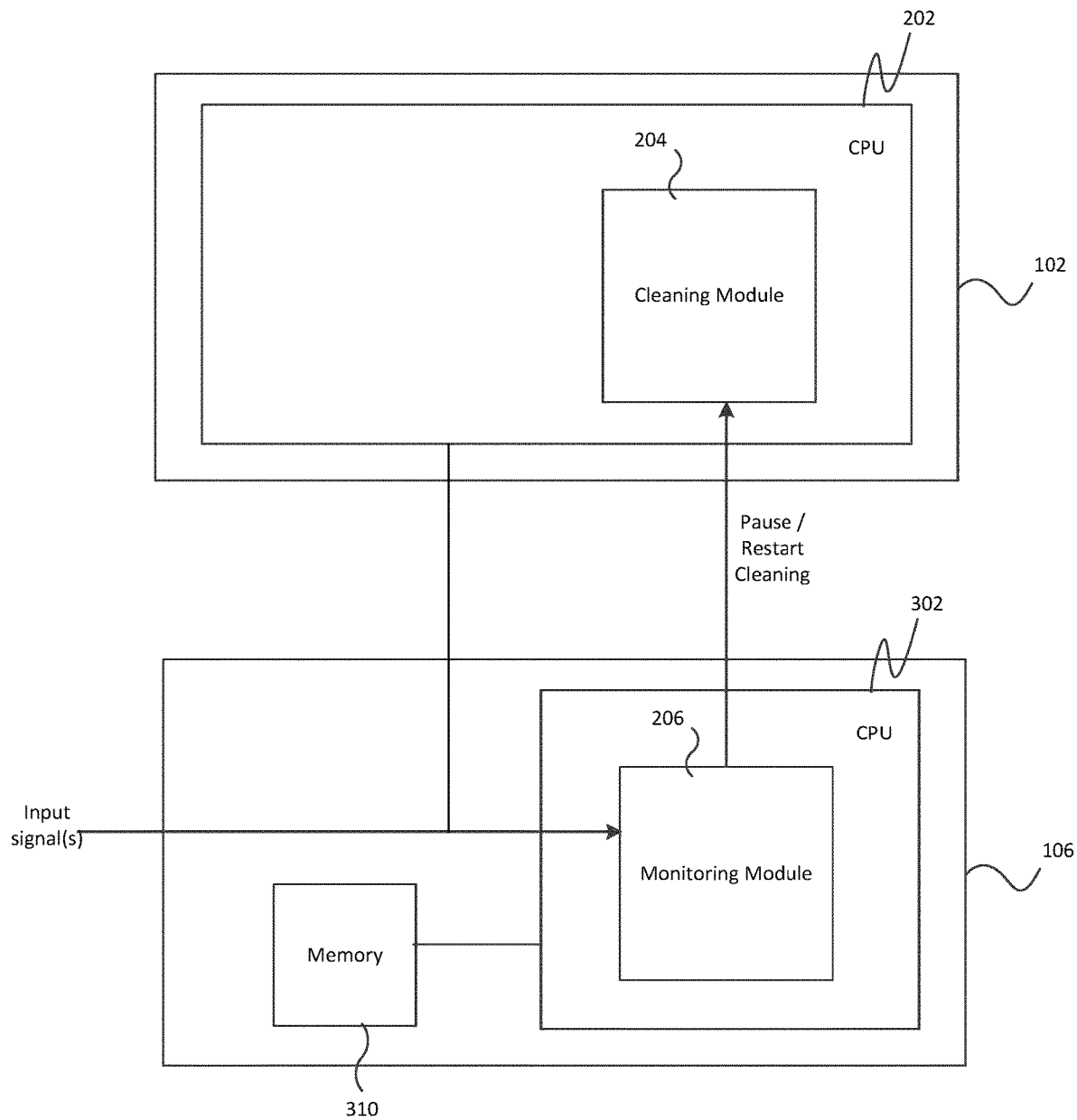
FIG. 3c illustrates the monitoring module and the cleaning module in accordance with yet another embodiment of the present disclosure.

FIG. 3c illustrates a monitoring module 206 and a cleaning module 204 in accordance with another embodiment of the present disclosure in which the cleaning module 204 is located on the robot 102 and the monitoring module 206 is located on the remote computing device 106.

As shown in FIG. 3c, the remote computing device 106 comprises a CPU 302 coupled to memory 310. The CPU 302 comprises the monitoring module 206. In the embodiment of FIG. 3c the monitoring module 206 on the remote computing device 106 is configured to communicate with the cleaning module 204 on the robot 102.

In this embodiment, the monitoring module 206 is configured to receive input signals and based on these input signals the monitoring module 206 is configured to detect that cleaning being performed by the robot is to be paused. In response to detecting that cleaning being performed by the robot is to be paused, the monitoring module 206 may be configured to automatically transmit a pause cleaning signal to the cleaning module 204 on the robot 102 to pause the cleaning. Alternatively, in response to detecting that cleaning being performed by the robot is to be paused, the monitoring module 206 may be configured to output a pause cleaning signal for validation by the user of the remote computing device 106 (e.g. via a display on the remote computing device 106). If the user of the remote computing device 106 confirms that the cleaning being performed by the robot is to be paused the user makes an appropriate input into the remote computing device 106 causing a pause cleaning signal to be output from the remote computing device 106 to the cleaning module 204 on the robot 102.

The monitoring module 206 is further configured to detect that cleaning performed by the robot is to be restarted based on these input signals. In response to detecting that cleaning performed by the robot is to be restarted, the monitoring module 206 may be configured to automatically transmit the restart cleaning signal to the cleaning module 204 on the robot 102 to restart the cleaning.

Alternatively, in response to detecting that cleaning performed by the robot is to be restarted, the monitoring module 206 may be configured to output a restart cleaning signal for validation by the user of the remote computing device 106. If the user of the remote computing device 106 confirms that the cleaning being performed by the robot is to be restarted, the user makes an appropriate input into the remote computing device 106 causing a restart cleaning signal to be output from the remote computing device 106 to the cleaning module 204 on the robot 102.

In the embodiment of FIG. 3c the input signals comprise at least one signal indicative of a speed of the vessel, this may be received from one or more of: a sensor on the robot or a sensor on the vessel.

Figure 4:
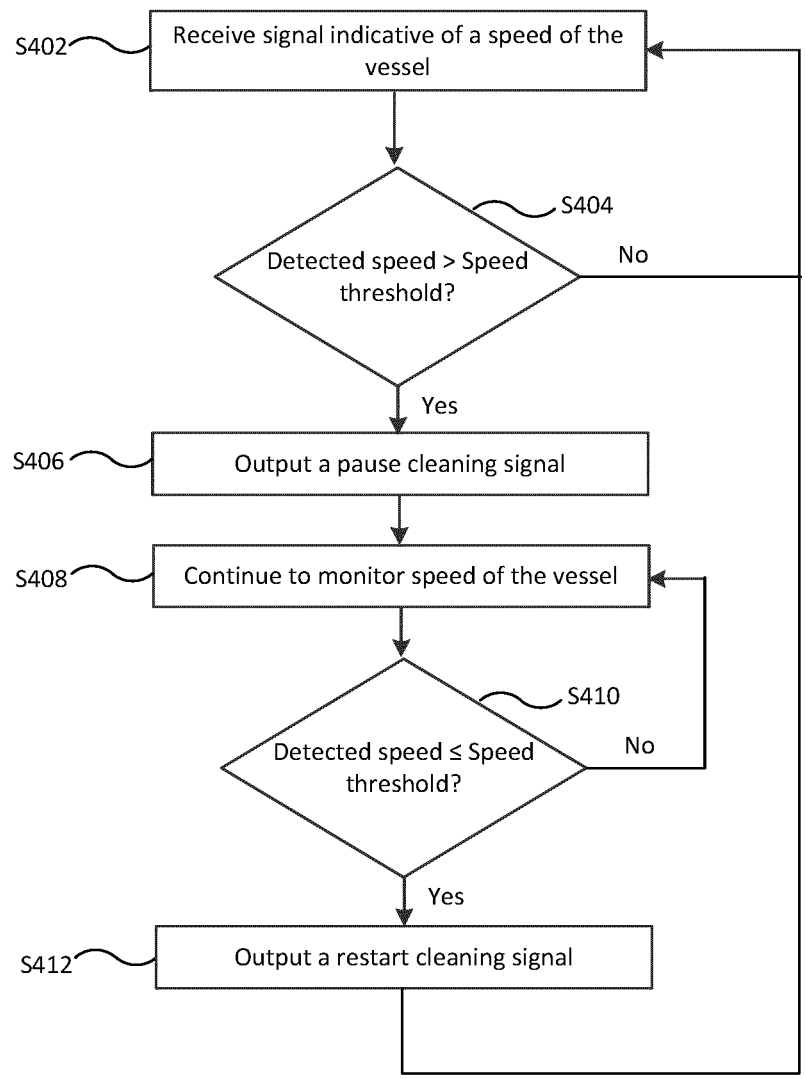
FIG. 4 illustrates a process of controlling the robot performed by the monitoring module.

FIG. 4 illustrates an example process 400 performed by the monitoring module 206 for controlling the robot.

As noted above the default state of the robot 102 is to continuously clean the hull 101 whilst travelling over the hull 101. The monitoring module 206 is configured to perform process 400 once a continuous cleaning operation has begun.

At step S402 the monitoring module 206 receives a signal indicative of the speed of the vessel 100. As noted above with reference to FIGS. 3a-c, the signal indicative of the speed of the vessel 100 may be received from a sensor on the robot, a sensor on the vessel or the remote computing device.

At S404, the monitoring module 206 determines if the detected speed is greater than a predetermined speed threshold. The value of the predetermined speed threshold may be stored in memory 210 (in embodiments of FIGS. 3a and 3b) or in memory 310 (in the embodiment of FIG. 3c).

The detected speed may comprise a measurement of the Speed Over the Ground of the vessel 100. In these embodiments, the predetermined speed threshold may be in the range 0.1-40 knots. Preferably the predetermined speed threshold is in the range 0.5-3.5 knots. For example the predetermined speed threshold may be 2 knots. It will be appreciated that this value for the predetermined speed threshold is merely an example and others may be used.

The detected speed may comprise a measurement of the Speed Through Water of the vessel 100. In these embodiments, the predetermined speed threshold may be in the range 0.1-40 knots. Preferably the predetermined speed threshold is in the range 2-10 knots. For example the predetermined speed threshold may be 6 knots. It will be appreciated that this value for the predetermined speed threshold is merely an example and others may be used.

If the monitoring module 206 determines that the detected speed is greater than the predetermined speed threshold, the process 400 proceeds to step S406 where the monitoring module 206 outputs a pause cleaning signal.

In the embodiments of FIGS. 3a and 3c, the pause cleaning signal is output from the monitoring module 206 to the cleaning module 204 on the robot 102. In the embodiment of FIG. 3b, the pause cleaning signal is output from the monitoring module 206 to the computing device 106.

In response to receiving the pause cleaning signal, the cleaning module 204 is configured to pause the cleaning being performed by the cleaning device 208 by communicating with the cleaning device 208.

When the continuous cleaning is paused, the robot may be configured to remain stationary at its current position on the hull of the vessel. Alternatively, upon detecting that cleaning being performed by the robot is to be paused, the robot may be configured to move to the docking station 104 or other location on the vessel designated as being a safe location whereby the robot will not be damaged or lost during high speed.

Whilst the continuous cleaning is paused, the monitoring module 206 continues to monitor the speed of the vessel based on input signals it receives. During the process 400, the monitoring module 206 may be configured to detect the speed of the vessel at predetermined intervals e.g. several times each second or every 1 minute, 2 minutes, 5 minutes, or 10 minutes. It will be appreciated that these values are merely examples and others may be used.

If the monitoring module 206 determines at step S410 that the speed of the vessel remains above the predetermined speed threshold then the cleaning is not restarted.

If the monitoring module 206 determines at step S410 that the speed of the vessel has dropped below the predetermined threshold, then the process 400 proceeds to step S412 where the monitoring module 206 outputs a restart cleaning signal indicating that continuous cleaning by the robot is to be restarted.

In the embodiments of FIGS. 3a and 3c, the restart cleaning signal is output from the monitoring module 206 to the cleaning module 204 on the robot 102. In the embodiment of FIG. 3b, the restart cleaning signal is output from the monitoring module 206 to the computing device 106 and the process 400 returns to step S402 where the monitoring module 206 continue to monitor speed of the vessel.

By combining the robot 102 capable of cleaning together with the monitoring module 206, the robot will clean when it is safe and when the fouling risk is highest and will thereby reduce the amount of fouling of the surface. The process 400 provides an efficient and safe method to reduce the amount of fouling on the hull of a vessel.

Whilst the process 400 illustrates a reactive mode of operation by the monitoring module 206 determining, at step S404, that the detected speed is greater than the predetermined speed threshold, in an alternative embodiment the monitoring module 206 may operate in a proactive mode of operation. In the proactive mode of operation, the monitoring module 206 predicts, at step S404, using the signal indicative of the speed of the vessel 100 received at step S402, whether the speed of the vessel will exceed the predetermined speed threshold within a predetermined time period. If the monitoring module 206 predicts that the speed of the vessel will exceed the predetermined speed threshold within the predetermined time period then the process 400 proceeds to step S406 and proceeds in accordance with the process described above.

In embodiments whereby upon detecting that cleaning being performed by the robot is to be paused, the robot is configured to move to the docking station 104, the prediction used by the monitoring module 206 in the proactive mode of operation allows for sufficient time for the robot to travel to the docking station 104 before the vessel reaches the predetermined speed and the robot 102 is at risk of being damaged or lost. It will be appreciated that the predetermined time period may be set in dependence on the size of the vessel and/or the speed that the robot 102 is able to travel over the hull 101.

In the embodiments of FIGS. 3a-c, the input signals may additionally comprise at least one signal indicative that the robot 102 is at risk of damage.

In these embodiments, during cleaning being performed by the robot, the monitoring module 206 is configured to detect that cleaning being performed by the robot is to be paused based on determining that the robot is at risk of damage, and in response, output the pause cleaning signal indicating that the cleaning is to be paused. Whilst the cleaning is paused, the monitoring module 206 is configured to detect that the robot is no longer at risk of damage, and in response, output the restart cleaning signal indicating that cleaning by the robot is to be restarted.

The monitoring module 206 may receive a camera signal from a camera, the camera signal comprising image data; and detect an object in a path of the robot (and thus detect that the robot is at risk of damage) based on analysing the image data. For example the robot 102 may be maneuvering from the robot station to the waterline above a bunker barge that is alongside the vessel. The camera may be on the robot itself (e.g. one of the sensors 212). Alternatively the camera may be on the vessel and configured to communicate with the robot via interface 216. In these embodiments, the monitoring module 206 is configured to detect that the robot is no longer at risk of damage based on the camera signal.

Alternatively the camera (on the robot or on the vessel) may transmit the cameral signal to the computing device 106 and a user viewing the image data may detect an object in a path of the robot (and thus detect that the robot is at risk of damage) and transmit a message to pause cleaning by the robot from the computing device 106 to the monitoring module 206. When the user viewing the image data captured by the camera detects that the robot is no longer at risk of damage, the user may transmit a message from the computing device 106 to the monitoring module 206 to restart the continuous cleaning.

As noted above, in addition to, or as an alternative to using a camera, a Lidar sensor or acoustic sensor may be used to detect that the robot is at risk of damage. Such a sensor may be on the robot or on the vessel.

The monitoring module 206 may determine that the robot is at risk of damage based on receiving a signal indicative that the robot is at risk of damage.

The signal indicative that the robot is at risk of damage may comprise wave information relating to the degree of waves in the aquatic environment of the vessel. The signal comprising wave information may be received by the monitoring module 206 from a wave sensor on the robot, a wave sensor on the vessel, the computing device 106 or a computing device on shore (e.g. at a meteorological station). During high waves the robot is at risk of being damaged or lost and thus the monitoring module 206 may take action to pause the cleaning to prevent this. In these embodiments, the monitoring module 206 is configured to detect that the robot is no longer at risk of damage based on receiving the signal comprising wave information.

The signal indicative that the robot is at risk of damage may comprise wind information relating to the degree of wind in environment of the vessel. The monitoring module 206 may use the wind information to detect that the robot is at risk of damage based on wind being a precursor to a high degree of waves. The signal comprising wind information may be received by the monitoring module 206 from a wind sensor on the robot, a wind sensor on the vessel, the computing device 106 or a computing device on shore (e.g. at a meteorological station). In these embodiments, the monitoring module 206 is configured to detect that the robot is no longer at risk of damage based on receiving the signal comprising wind information.

The signal indicative that the robot is at risk of damage may not comprise environmental information and instead may merely be a message to pause cleaning received from a computing device (e.g. the computing device 106 or a computing device on shore (e.g. at a meteorological station)) based on the computing device detecting that the robot is at risk of damage due to high waves. In these embodiments, the monitoring module 206 is configured to detect that the robot is no longer at risk of damage based on receiving a message to restart cleaning received from the computing device.

Whilst embodiments have been described herein with reference to using at least one signal indicative that the robot 102 is at risk of damage, in addition to at least one signal indicative of a speed of the vessel, to control the pausing of the continuous cleaning and subsequent restarting of the cleaning performed by the robot, in other aspects of the present disclosure the at least one signal indicative that the robot 102 is at risk of damage may be used independently of such speed information to control the pausing of the continuous cleaning and subsequent restarting of the cleaning performed by the robot.

In the embodiments of FIGS. 3a-c, the input signals may additionally comprise at least one signal indicative of a risk of fouling on the hull of the vessel.

In these embodiments, the monitoring module 206 is configured to calculate a fouling risk value based on receiving the signal indicative of a risk of fouling on the hull of the vessel, and compare the fouling risk value with a fouling risk threshold. During cleaning being performed by the robot, the monitoring module 206 is configured to detect that cleaning being performed by the robot is to be paused based on determining that the fouling risk value is less than the fouling risk threshold, and in response, output the pause cleaning signal indicating that the cleaning is to be paused.

Whilst the cleaning is paused, the monitoring module 206 is configured to detect that cleaning performed by the robot is to be restarted based on determining that the fouling risk value has increased above the predetermined threshold, and in response, output the restart cleaning signal indicating that cleaning by the robot is to be restarted.

The signal indicative of fouling on the hull of the vessel may comprise information on one or more of: (i) an amount of chlorophyll in an aquatic environment of the vessel; (ii) a pH level of the aquatic environment; (iii) a nutrient level in the aquatic environment; (iv) a light intensity in the aquatic environment sensed; (v) a saline level of the aquatic environment; (vi) a temperature of the aquatic environment; (vii) an amount of carbon dioxide in the aquatic environment; (viii) a geographical location of the vessel; (ix) an amount of gaseous oxygen dissolved in water in the aquatic environment of the vessel and (x) a depth of the aquatic marine environment.

The signal indicative of fouling on the hull of the vessel may be received from one or any combination of: one or more sensor located on the robot 102, one or more sensor located on the vessel 100, a computing device 106 on the vessel, or a satellite.

Figure 5:
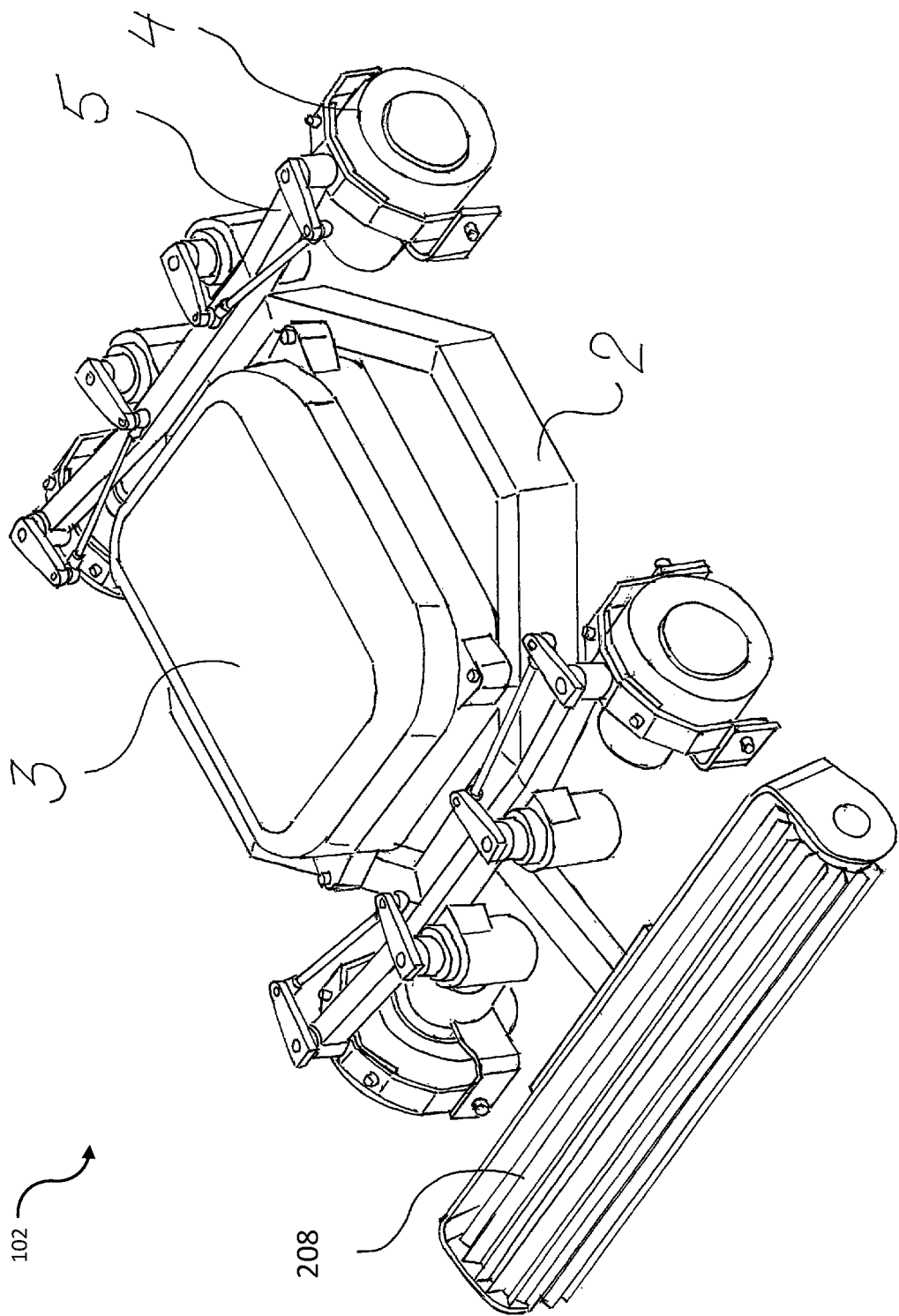
FIG. 5 illustrates an example hull cleaning robot.

Whilst embodiments have been described herein with reference to using at least one signal indicative of a risk of fouling on the hull of the vessel, in addition to at least one signal indicative of a speed of the vessel, to control the pausing of the continuous cleaning and subsequent restarting of the cleaning performed by the robot, in other aspects of the present disclosure the at least one signal indicative of a risk of fouling on the hull of the vessel may be used independently of such speed information to control the pausing of the continuous cleaning and subsequent restarting of the cleaning performed by the robot FIG. 5 illustrates an example robot 102 for cleaning the painted hulls of marine vessels. The wheels 4 of the robot are magnetic, in order to adhere to ferrous hulls. The robot 102 is driven by the wheels 4, and the wheels 4 are driven by electric motors (not shown). In FIG. 5, the robot 102 is shown fully assembled in a perspective view. The chassis 2 of the robot 1 is a perimeter frame that holds a sealed container 3 that encloses a power supply (e.g. batteries) and may include one or more of the electrical components shown in FIG. 2. The container 3 is waterproof and sealed to prevent water ingress. Two beam "axles" 5 are fixed to the chassis 2 and these beams 5 support the wheels 4 as well as associated elements of the suspension arrangement and steering mechanisms for the wheels 4. The robot 102 includes the cleaning mechanism 208, which may take the form of a rotary cylindrical brush, and this is also fixed to the chassis 2. The cleaning mechanism 208 is controlled by the cleaning module 204.

It will be appreciated that FIG. 5 shows just one example form that the robot 102 may take and other examples are possible.

Generally, any of the functions described herein can be implemented using software, firmware, hardware (e.g., fixed logic circuitry), or a combination of these implementations. The terms "functionality" and "module" as used herein generally represent software, firmware, hardware, or a combination thereof. In the case of a software implementation, the functionality or module represents program code that performs specified tasks when executed on a processor (e.g. CPU or CPUs). The program code can be stored in one or more computer readable memory device (e.g. memory 210 or memory 310). The features of the techniques described below are platform-independent, meaning that the techniques may be implemented on a variety of commercial computing platforms having a variety of processors.

While the present disclosure has been particularly shown and described with reference to preferred embodiments, it will be understood to those skilled in the art that various changes in form and detail may be made without departing from the scope of the present disclosure as defined by the appendant claims.

The invention claimed is:

1. A method of controlling a robot configured to clean a hull of a vessel whilst travelling over said hull, the method comprising:
receiving at least one signal indicative of a speed of the vessel;
during cleaning being performed by the robot, detecting that cleaning being performed by the robot is to be paused based on (i) determining, from said at least one signal, that the speed of the vessel exceeds a predetermined speed threshold, or (ii) predicting, using said at least one signal, that the speed of the vessel will exceed the predetermined speed threshold within a predetermined time period;
in response to said detecting that cleaning being performed by the robot is to be paused, outputting a pause cleaning signal indicating that said cleaning is to be paused;
whilst said cleaning is paused, detecting that cleaning performed by the robot is to be restarted based on the determining that the speed of the vessel has dropped below the predetermined threshold, and in response, outputting a restart cleaning signal indicating that cleaning by the robot is to be restarted.

2. The method of claim 1, wherein the at least one signal comprises a sensor signal received from at least one sensor, the sensor signal comprising sensor data output by the at least one sensor.

3. The method of claim 2, wherein the at least one sensor comprises one or more sensors on the robot.

4. The method of claim 2, wherein the at least one sensor comprises one or more sensor on the vessel.

5. The method of claim 4, wherein the at least one sensor comprises an anchor sensor and the sensor data indicates that an anchor of the vessel is in a raised or lowered state.

6. The method of claim 2, wherein the at least one sensor comprises one or more of:
a speed sensor and the sensor data comprises speed data indicating the speed of the vessel; and
a vibration sensor and the sensor data comprises vibration data indicating the speed of the vessel.

7. The method of claim 1, wherein the at least one signal comprises a signal received from a remote computing device external to said robot.

8. The method of claim 7, wherein the signal received from the remote computing device comprises one or more of:
speed data indicating the speed of the vessel; and
an indication that an anchor of the vessel is in a raised or lowered state.

9. The method of claim 1, wherein the at least one signal is indicative of a Speed Over the Ground of the vessel or a Speed Through Water of the vessel.

10. The method of claim 1, further comprising:
during cleaning being performed by the robot, detecting that cleaning being performed by the robot is to be paused based on (i) determining that the robot is at risk of damage, and in response, outputting the pause cleaning signal indicating that said cleaning is to be paused;
whilst said cleaning is paused, detecting that the object is no longer at risk of damage, and in response, outputting the restart cleaning signal indicating that cleaning by the robot is to be restarted.

11. The method of claim 10, wherein the determining that the robot is at risk of damage comprises:
receiving a camera signal from a camera, the camera signal comprising image data; and
detecting an object in a path of the robot based on analysing the image data.

12. The method of claim 1, further comprising:
calculating a fouling risk value based on receiving a signal indicative of a risk of fouling on the hull of the vessel, and comparing the fouling risk value with a fouling risk threshold;
during cleaning being performed by the robot, detecting that cleaning being performed by the robot is to be paused based on determining that the fouling risk value is less than the fouling risk threshold, and in response, outputting the pause cleaning signal indicating that said cleaning is to be paused;
whilst said cleaning is paused, detecting that cleaning performed by the robot is to be restarted based on determining that the fouling risk value has increased above the predetermined threshold, and in response, outputting the restart cleaning signal indicating that cleaning by the robot is to be restarted.

13. The method of claim 12, wherein the signal indicative of fouling on the hull of the vessel comprises information on one or more of: (i) an amount of chlorophyll in an aquatic environment of the vessel; (ii) a pH level of the aquatic environment; (iii) a nutrient level in the aquatic environment; (iv) a light intensity in the aquatic environment sensed; (v) a saline level of the aquatic environment; (vi) a temperature of the aquatic environment; (vii) an amount of carbon dioxide in the aquatic environment; (viii) a geographical location of the vessel; (ix) an amount of gaseous oxygen dissolved in water in the aquatic environment of the vessel; and (x) a depth of the aquatic environment.

14. The method of claim 1, wherein the method is performed by a monitoring module on said robot, and wherein upon detecting that cleaning being performed by the robot is to be paused, the method comprises outputting the pause cleaning signal to a cleaning module on the robot to pause said cleaning; and upon detecting that cleaning performed by the robot is to be restarted, the method comprises outputting the restart cleaning signal to the cleaning module on the robot to restart said cleaning.

15. The method of claim 1, wherein the method is performed by a monitoring module on said robot, and wherein upon detecting that cleaning being performed by the robot is to be paused, the method comprises outputting the pause cleaning signal to a remote computing device external to said robot for validation by a user; and upon detecting that cleaning performed by the robot is to be restarted, the method comprises outputting the restart cleaning signal to the remote computing device external to said robot for validation by the user.

16. The method of claim 1, wherein the method is performed by a monitoring module on a remote computing device external to said robot.

17. The method of claim 16, wherein upon detecting that cleaning being performed by the robot is to be paused, the method comprises automatically transmitting the pause cleaning signal to a cleaning module on the robot to pause said cleaning; and upon detecting that cleaning performed by the robot is to be restarted, the method comprises automatically transmitting the restart cleaning signal to the cleaning module on the robot to restart said cleaning.

18. The method of claim 16, wherein upon detecting that cleaning being performed by the robot is to be paused, the method comprises outputting the pause cleaning signal to a user for validation before transmitting the pause cleaning signal to a cleaning module on the robot to pause said cleaning; and upon detecting that cleaning performed by the robot is to be restarted, the method comprises outputting the restart cleaning signal to a user for validation before transmitting the restart cleaning signal to the cleaning module on the robot to restart said cleaning.

19. A computer-readable storage medium comprising instructions which, when executed by a processor, cause the processor to carry out the method of claim 1.

20. A robot configured to clean a hull of a vessel whilst travelling over said hull, the robot comprising a processor configured to:
receive at least one signal indicative of a speed of the vessel;
during cleaning being performed by the robot, detect that cleaning being performed by the robot is to be paused based on (i) determining, from said at least one signal, that the speed of the vessel exceeds a predetermined speed threshold, or (ii) predicting, using said at least one signal, that the speed of the vessel will exceed the predetermined speed threshold within a predetermined time period;
in response to said detection that cleaning being performed by the robot is to be paused, output a pause cleaning signal indicating that said cleaning is to be paused;
whilst said cleaning is paused, detect that cleaning performed by the robot is to be restarted based on the determining that the speed of the vessel has dropped below the predetermined threshold, and in response, output a restart cleaning signal indicating that cleaning by the robot is to be restarted.

* * * * *